(12) United States Patent
Kraljic et al.

(10) Patent No.: US 6,922,154 B2
(45) Date of Patent: Jul. 26, 2005

(54) INFANT SAFETY DEVICE

(76) Inventors: Majda J. Kraljic, 7866 Brentwood Rd., Mentor, OH (US) 44060; Sergio Kraljic, 7866 Brentwood Rd., Mentor, OH (US) 44060

( * ) Notice: Subject to any disclaimer, the term of this patent is extended or adjusted under 35 U.S.C. 154(b) by 12 days.

(21) Appl. No.: 10/300,091

(22) Filed: Nov. 20, 2002

(65) Prior Publication Data
US 2004/0095252 A1 May 20, 2004

(51) Int. Cl.[7] ................................................ G08B 21/00
(52) U.S. Cl. .................... 340/687; 340/457.4; 340/667; 340/539.1; 340/459; 340/522; 180/271; 180/272; 180/273
(58) Field of Search .......................... 340/687, 457.4, 340/667, 539.1, 459, 522; 180/271, 272, 273

(56) References Cited
U.S. PATENT DOCUMENTS

| | | | |
|---|---|---|---|
| 5,260,684 A | * 11/1993 | Metzmaker | 340/457.1 |
| 5,581,234 A | * 12/1996 | Emery et al. | 340/457.1 |
| 6,104,293 A | * 8/2000 | Rossi | 340/573.1 |
| 6,266,592 B1 | * 7/2001 | LeMense | 701/45 |
| 6,393,348 B1 | 5/2002 | Ziegler et al. | |
| 6,422,595 B1 | 7/2002 | Breed et al. | |
| 6,442,465 B2 | 8/2002 | Breed et al. | |
| 6,489,889 B1 | * 12/2002 | Smith | 340/457 |
| 6,535,137 B1 | * 3/2003 | Ryan | 340/687 |
| 2002/0080014 A1 | 6/2002 | McCarthy | |

FOREIGN PATENT DOCUMENTS

JP                   255379    * 9/2000    ........... B60R/22/12

* cited by examiner

Primary Examiner—Tai T. Nguyen
(74) Attorney, Agent, or Firm—Forrest L. Collins Law Offices, LLC; Forrest L. Collins

(57) ABSTRACT

An apparatus is provided for warning when a person such as an infant has been left in an infant seat in a vehicle and the operator of the vehicle has departed from the vehicle. The apparatus includes an occupant detection mechanism for detecting the presence of an occupant within a seat-belted seat located within a vehicle; optionally a mechanism for detecting the state of the vehicle's motion; a control unit for generating an alarm signal when the occupant detection mechanism detects the presence of an occupant within the infant seat and an alarm unit for generating an alarm in response to the alarm signal.

13 Claims, 2 Drawing Sheets

INFANT SAFETY DEVICE

BACKGROUND OF THE INVENTION

1. Field of the Invention

The purpose of this invention is to prevent tragic deaths in which children have been mistakenly left in automobiles after the driver had reached the desired destination and left the vehicle. The deaths have usually been caused by a buildup of excessive heat or excessive cold within the vehicle during the absence of the driver. Infants, in particular, are susceptible to dehydration when subjected to the elevated temperatures within an enclosed vehicle, and can easily slip into a comatose state.

Systems utilizing a motion detector to detect the presence of a child within a located vehicle are known. While systems utilizing a motion detector provide some advantages, particularly in the case of older children that may inadvertently lock themselves in a vehicle while playing and may be actively seeking escape, it fails to protect infants who have been left asleep in their child seats and are not capable of sufficient activity to set off a motion detector. Infants, for example, may become dehydrated during sleep and may drift into a comatose state without ever waking.

In view of the above, it is an objective of the invention to provide a system that warns when a child has been left in the infant seat under dangerous conditions.

2. Description of the Art Practices

McCarthy, et al., discloses in U.S. Published patent application 20020080014 dated 27 Jun. 2002 a vehicle compartment occupancy detection system is operable to detect a presence of a person or animal within a vehicle compartment, such as a vehicle cabin or trunk space, by detecting a change in an electric field within the compartment. The detection system includes an electric field generator and an electric field sensor which is operable to detect changes in the electric field generated within the compartment. The detection system may further be operable to activate an accessory in response to one or more inputs and the electric field sensor. The detection system may be operable in response to one or more inputs which are indicative of a hazardous condition within the vehicle compartment. The detection system may then be operable to take corrective action to at least partially alleviate the hazardous condition and/or to communicate to a person exteriorly of the vehicle that the hazardous condition exists.

Rossi in U.S. Pat. No. 6,104,293 issued 15 Aug. 2000 discloses an apparatus is provided for warning when a child has been left in an infant seat and a vehicle as been turned off. The apparatus includes an occupant detection mechanism for detecting the presence of an occupant within an infant seat located within a vehicle; an ignition detection mechanism for detecting the state of the vehicle's ignition system; a control unit for generating an alarm signal when the occupant detection mechanism detects the presence of an occupant within the infant seat and the ignition detection mechanism detects that the vehicle's ignition system has been turned from an "on" state to an "off" state; and an alarm units for generating an alarm in response to the alarm signal. The components of the apparatus can be located within the infant seat, within the vehicle or combined within the infant seat and the vehicle.

Ziegler, et al. in U.S. Pat. No. 6,393,348 issued 21 May 2002 discloses a passenger monitoring safety seat and system to monitor vital functions of a passenger placed in the vehicle safety seat. The system includes at least one sensor adapted of contact a passenger placed in the vehicle safety seat so that said sensor provides and transmits an electrical output signal indicative of a selected vital function pertaining to the passenger. A display unit, remote from the vehicle safety seat, includes a receiver and circuitry to acquire and amplify the output signal transmitted by the sensor, and the display unit provides a visual display indicative of said selected vital function. The display unit also provides an alarm if the output signal from the sensor falls outside a pre-selected range.

U.S. Pat. No. 6,422,595 issued 23 Jul. 2002 to Breed, et al. discloses a method in a vehicle for identifying an occupying item in which information or data about the occupying item is obtained and a pattern recognition system analyzes this information or data with respect to size, position., shape and/or motion to determine what the occupying item is whereby a distinction can be made as to whether the occupying item is human or an inanimate object. The information or data may be obtained by one or more receiver arrays which converts electromagnetic radiation into electrical signals such that the information or data about the occupying item is in the form of one or more electrical signals representative of an image of the occupying item. The same information or data may be used in arrangements and methods for controlling a vehicular component which also include a pattern recognition system for receiving and analyzing the information or data and a control unit for controlling the vehicular component based on the analysis of the information or data about the occupying item with respect to the size, position, shape and/or motion by the pattern recognition system.

U.S. Pat. No. 6,442,465 issued 27 Aug. 2002 to Breed, et al. discloses a system and method for controlling operation of a vehicle or a component thereof based on recognition of a individual including a processor embodying a pattern recognition algorithm trained to identify whether a person is the individual by analyzing data derived from optical images and an optical receiving unit for receiving images including the person and deriving data from the images. The optical receiving unit provides the data to the algorithm to obtain an indication from the algorithm whether the person is the individual. A security system enables operation of the vehicle when the algorithm provides an indication that the person is an individual authorized to operate the vehicle and prevents operation of the vehicle when the algorithm does not provide an indication that the person is an individual authorized to operate the vehicle. A component adjustment system adjusts the component based on the recognition of the individual.

To the extent that the foregoing references are relevant to the present invention, they are herein specifically incorporated by reference.

SUMMARY OF THE INVENTION

The present invention describes a safety device comprising:

a seat belt interlock has a male connector and a female connector;

said female connector of the said seat belt interlock, for when in use, receiving a vehicular seat belt male connector;

said male connector of said seat belt interlock, for when in use, connecting with a vehicular seat belt female connector;

said seat belt interlock has detection means for determining when said male connector of said seat belt interlock is connected with the vehicular seat belt female connector and the said female connector of the said seat belt interlock is connected with the vehicular seat belt male connector; and, the said seat belt interlock has transmitter means to alert at least one person that the said male connector of the said seat belt interlock is connected with the vehicular seat belt female connector while the said female connector of the seat belt interlock is connected with the vehicular seat belt male connector.

The present invention further describes a safety device comprising:

a seat belt interlock has a male connector and a female connector;

said female connector of the said seat belt interlock, for when in use, receiving a vehicular seat belt male connector;

said male connector of said seat belt interlock, for when in use, connecting with a vehicular seat belt female connector;

said seat belt interlock has detection means for determining if at least one said male connector of said seat belt interlock or the said female connector of said seat belt interlock is connected respectively with the vehicular seat belt female connector or the vehicular seat belt male connector, and;

the said seat belt interlock has transmitter means to alert at least one person that at least one of the said male connector of the said seat belt interlock or the said female connector of the said seat belt interlock is connected respectively with the seat belt female connector or the seat belt male connector.

The present invention also describes a method of alerting an individual that an unsafe condition exists in a vehicle comprising obtaining a safety device comprising:

a seat belt interlock male connector and a seat belt interlock female connector;

seat belt interlock female connector, for when in use, receiving a vehicular seat belt male connector;

seat belt interlock male connector, for when in use, connecting with a vehicular seat belt female connector;

said seat belt interlock has detection means for determining if at least one of seat belt interlock male connector or the said seat belt interlock female connector is connected respectively with the vehicular seat belt female connector or the vehicular seat belt male connector, and;

the said seat belt interlock has means to alert at least one person that at least one of the said seat belt interlock male connector is connected with the said seat belt female connector or the said seat belt interlock female connector is connected with the seat belt male connector; and operating the device by connecting at least one of the said seat belt female connector with a vehicular seat belt male connector or connecting the said seat belt interlock male connector with a vehicular seat belt female connector.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

With more particular reference to the drawings the following is set forth.

DETAILED DESCRIPTION OF THE INVENTION

Figure 1:
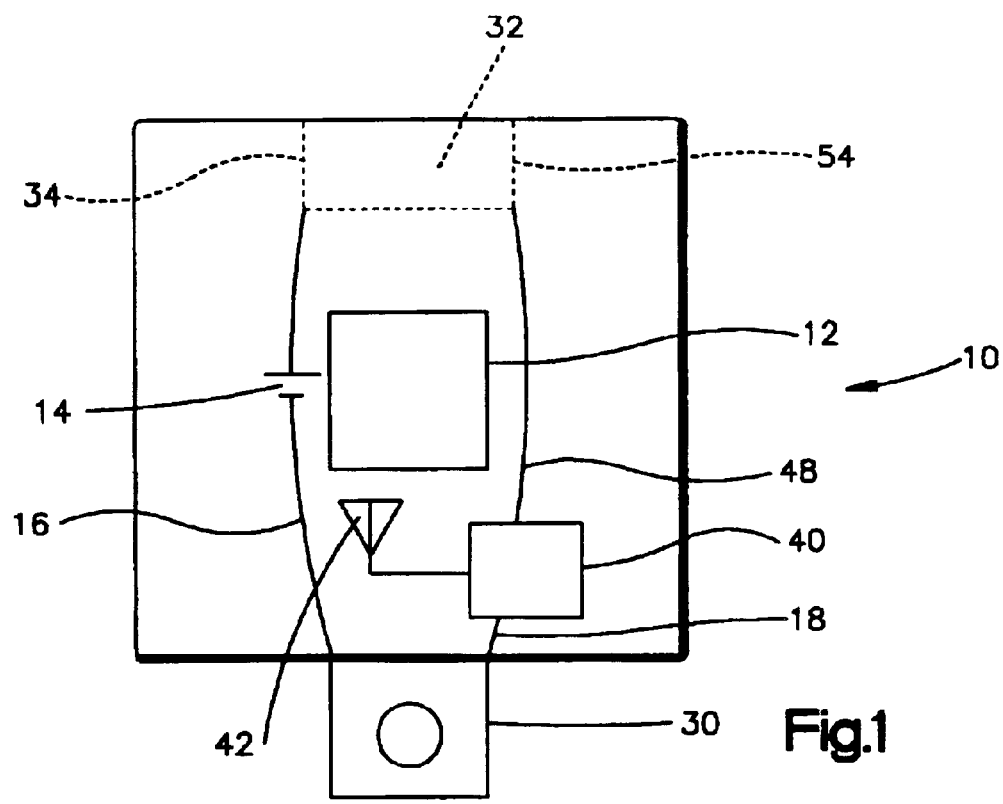
FIG. 1 is a plan view of an aspect of the invention.

As best seen in FIG. 1 is a seat belt interlock 10. The seat belt interlock 10 has a release mechanism 12. An electrical power source such as a battery 14 is within the seat belt interlock 10. Also located within the seat belt interlock 10 is a first electrically conductive wire 16. A second electrically conductive wire 18 is also located within the seat belt interlock 10.

The seat belt interlock 10 terminates at one end with a male seat belt connector 30. The male seat belt connector 30 is electrically conductive. The male seat belt connector 30 is electrically connected with the electrically conductive wire 16. The male seat belt connector 30 is electrically connected with the second electrically conductive wire 18.

The seat belt interlock 10 terminates at the opposite end thereof with a female seat belt connector 32. The female seat belt connector 32 has an electrically conductive region 34 with the electrically conductive wire 16. The female seat belt connector 32 is electrically conductive with the second electrically conductive wire 18.

A transmitter 40 capable of transmitting a radio frequency signal is located within the seat belt interlock 10. The transmitter 40 will when activated transmit a radio frequency signal through the antenna 42. The transmitter 40 within the seat belt interlock 10 is electrically connected with the 30. For simplicity, the transmitter 40 is also electrically connected with an electrically conductive wire 48 located within the seat belt interlock 10.

The female seat belt connector 32 has a second electrically conductive region 54. The electrically conductive wire 48 is electrically connected with the electrically conductive region 54 of the seat belt connector 32.

Figure 2:
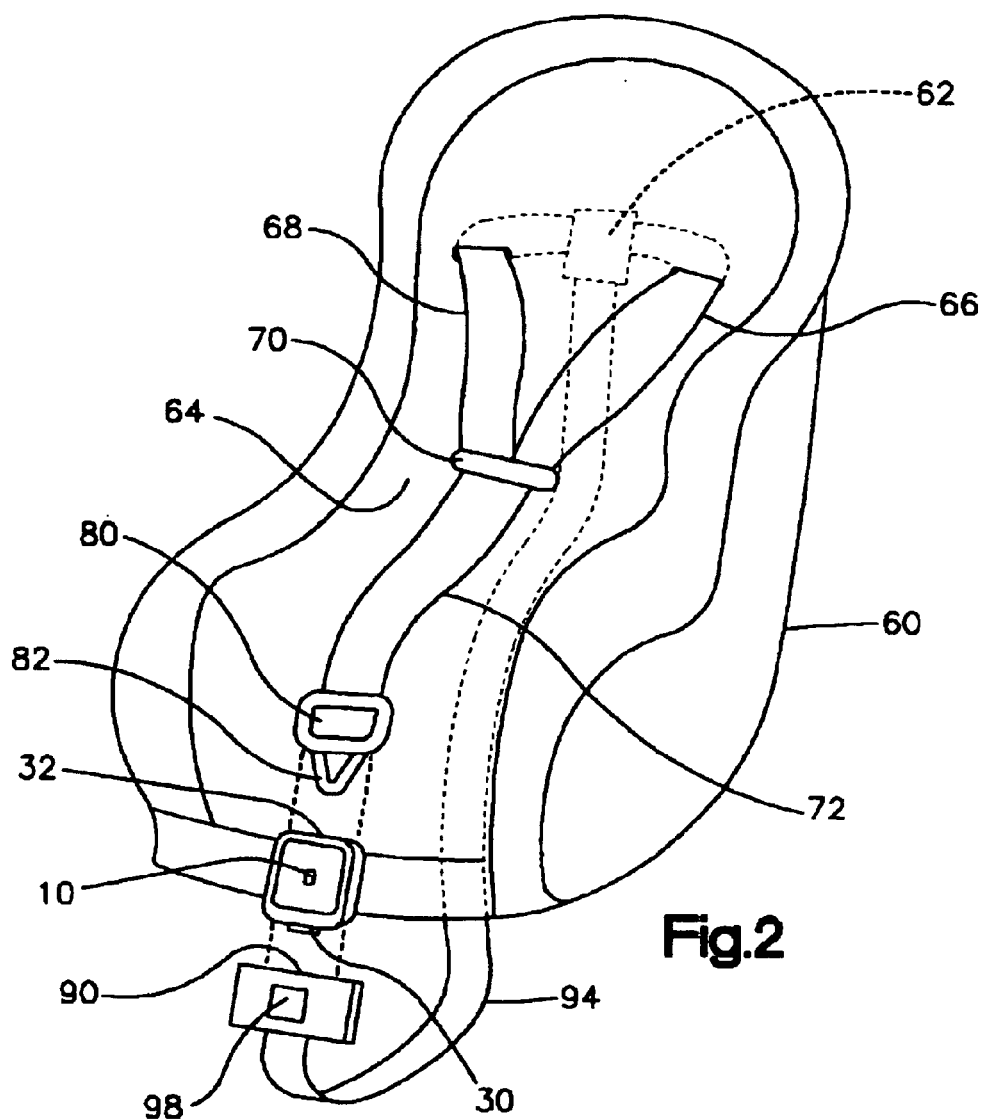
FIG. 2 is a perspective view of the invention.

As best seen in FIG. 2, is a conventional infant seat 60. The conventional infant seat 60 has a seat belt retainer 62. The seat belt retainer 62 is connected with a seat belt restraint strap 66. The seat belt restraint strap 66 passes through an opening (not shown) in the conventional infant seat 60 to promote availability to the seating region of the conventional infant seat 60.

The seat belt retainer 62 is also connected with a seat belt restraint strap 68. The seat belt restraint strap 68 passes through a second opening (not shown) in the conventional infant seat 60 to promote availability to the seating region of the conventional infant seat 60.

The conventional infant seat 60 has a connector mechanism 70. The connector mechanism 70 when in use has the ability to pull the seat belt restraint strap 66 and the seat belt restraint strap 68 together to restrain an occupant of the conventional infant seat 60. The connector mechanism 70 may be fixedly connected to the seat belt restraint strap 66 or the seat belt restraint strap 68. The connector mechanism 70 may also be detachable from the seat belt restraint strap 66 and the seat belt restraint strap 68.

The seat belt restraint strap 66 and the seat belt restraint strap 68 fixedly connect at a region distally from the seat belt retainer 62 to form a seat belt region 72. The seat belt region 72 terminates at a male seat belt connector region 80 (a seat belt buckle). The male seat belt connector region 80 has a male seat belt insertion point 82. The male seat belt insertion point 82 is electrically conductive.

A female seat belt connector region 90 is fixedly connected with a seat belt restraint strap 94. The seat belt restraint strap 94 is connected with the seat belt ratainer 62. The seat belt restraint strap 94 is located to the rear or non-seating area of the conventional infant seat 60. A seat belt release mechanism 98 is located on the obverse side of the female seat belt connector region 90.

Figure 3:
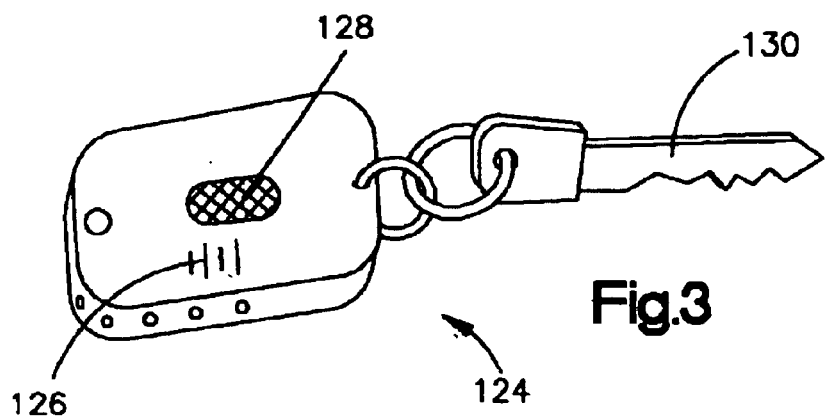
FIG. 3 is a perspective of a part of he invention.

As best seen in FIG. 3 is a key fob 124. The key fob 124 has a radio frequency receiver 126. There is also shown in FIG. 3 a speaker 128. There is also shown in FIG. 3 an automobile key 132.

In operation, the seat belt interlock 10 is connected through the male seat belt connector 30 into female seat belt connector region 90 to restrain an infant (not shown). The seat belt interlock 10 is then connected to the male seat belt insertion point 82. The infant is then restrained in the conventional infant seat 60 and the connector mechanism 70 is tightened.

When the vehicle in which the conventional infant seat 60 with the restrained infant reaches its destination the operator of the vehicle will exit the vehicle. As the male seat belt connector 30 is connected with the female seat belt connector 32 electrical current may flow from the electrically conductive wire 16 to the electrically conductive wire 48. As the electrically conductive region 54 is connected with the electrically conductive wire 48 an electrical current may be transmitted through the electrically conductive region 54.

When the male seat belt insertion point 82 is connected with the female seat belt connector 32 the electrical current will flow though the male seat belt insertion point 82 to the 34. In this manner the electrical circuit is completed to the battery 14 and the transmitter will transmit a signal through the antenna 42.

If the operator does not remove the infant from the conventional infant seat 60 the transmitter 40 will begin to transmit a radio frequency signal through the antenna 42. The transmitted radio frequency signal is received by the radio frequency receiver 126 in the key fob 124. The speaker 128 will then cause an audible alerting sound to emanate from the key fob 124. The audible alerting sound may be an infant crying.

Figure 4:
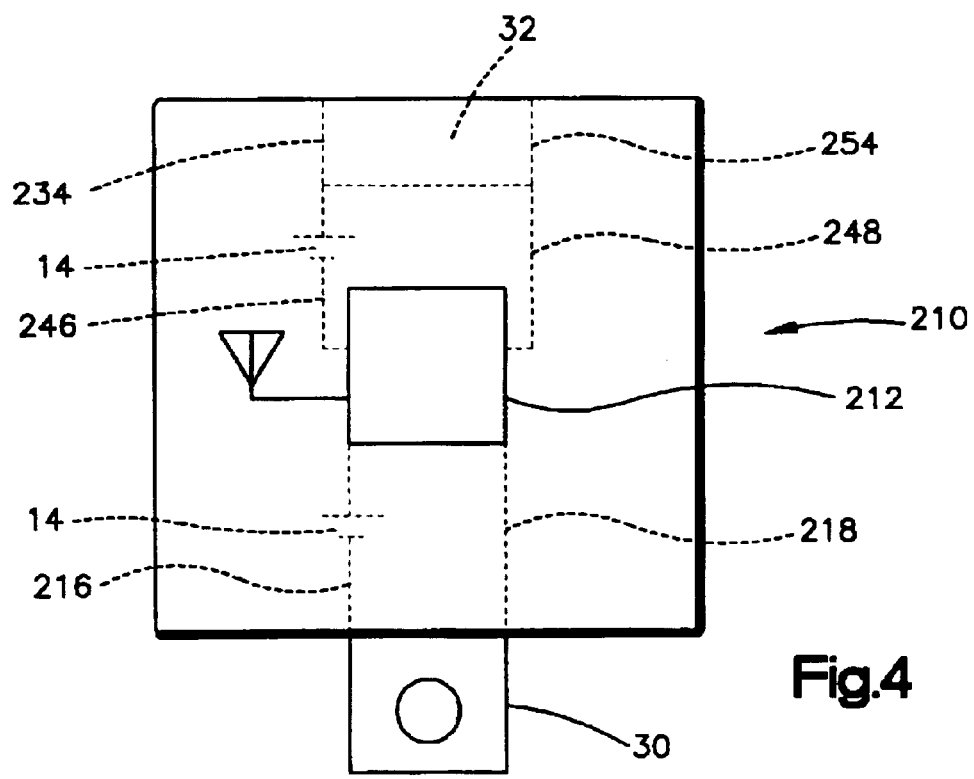
FIG. 4 is another embodiment of the invention similar to FIG. 1.

A second embodiment of the invention is shown in FIG. 4. A seat belt interlock 210 utilizes many of the same components as the seat belt interlock 10. There are two batteries 14 in separate circuits in the seat belt interlock 210. A transmitter 212 is positioned with the seat interlock 210. A wire 216 in the first circuit (or a wire 216A in the second circuit) provides an electrical pathway 234 from the seat belt connector 32 to a transmitter 212 through electrically conductive wire 248 to the electrically conductive region 254.

The transmitter 212 is activated if the seat belt interlock 210 is not properly connected, e.g. the seat belt will not restrain an infant and a transmitted signal from the transmitter 212 will alert the operator of the vehicle that a malfunction is occurring. In a similar fashion the second circuit comprising an electrically conductive wire and electrically conductive wire 218 and the male seat belt connector 30 will also provide a malfunction signal.

The seat belt interlock 10 and the seat belt interlock 210 may be operated such that the radio frequency signal is not generated (delayed) for a specified time interval. The radio frequency signal from the seat belt interlock 10 and the seat belt interlock 210 may be generated if the vehicle is not in motion for a specified time interval. If a predetermined distance between the transmitter 40 and the receiver 126 is met or exceeded.

The seat belt interlock 210 must be fully disconnected to prevent an alerting signal. Thus a malfunction warning system and an infant warning system are combined.

From the above description of the invention, those skilled in the art will perceive improvements, changes and modifications. Such improvements, changes and modifications within the skill of the art are intended to be covered by the appended claims.

What is claimed is:

1. A safety device comprising:
   a seat belt interlock has a male connector and a female connector;
      said female connector of the said seat belt interlock, for when in use, receiving a vehicular seat belt male connector;
      said male connector of said seat belt interlock, for when in use, connecting with a vehicular seat belt female connector;
      said seat belt interlock has detection means for determining when said male connector of said seat belt interlock is connected with the vehicular seat belt female connector and the said female connector of the said seat belt interlock is connected with the vehicular seat belt male connector;
      the said seat belt interlock has radio frequency signal transmitter means to alert at least one person that the said male connector of the said seat belt interlock is connected with the vehicular seat belt female connector while the said female connector of the seat belt interlock is connected with the vehicular seat belt male connector, and
   a signal receiving means which is separate from the said transmitter.

2. The safety device, according to claim 1 wherein the said seat belt interlock signal receiving means which is separate from the said transmitter is a key fob.

3. The safety device, according to claim 2, wherein the said seat belt interlock signal receiving means which is separate from the said transmitter is a key fob has the appearance of a human infant.

4. The safety device, according to claim 3, wherein the said seat belt interlock signal receiving means which is separate from the said transmitter converts a signal received from the said means to alert at least one person to a sound mimicking a human infant.

5. A safety device comprising:
   a seat belt interlock has a male connector and a female connector;
      said female connector of the said seat belt interlock, for when in use, receiving a vehicular seat belt male connector;
      said male connector of said seat belt interlock, for when in use, connecting with a vehicular seat belt female connector;
      said seat belt interlock has detection means for determining if at least one said male connector of said seat belt interlock or the said female connector of said seat belt interlock is connected respectively with the vehicular seat belt female connector or the vehicular seat belt male connector;
      the said seat belt interlock has radio frequency signal transmitter means to alert at least one person that at least one of the said male connector of the said seat belt interlock or the said female connector of the said seat belt interlock is connected respectively with the vehicular seat belt female connector or the vehicular seat belt male connector, and a signal receiving means which is separate from the said transmitter.

6. The safety device, according to claim 5, wherein the said safety device transmitter means transmits a second signal to alert at least one person that only one of the said male connector of the said seat belt interlock or the said female connector of the said seat belt interlock is connected respectively with the seat belt female connector or the seat belt male connector.

7. The safety device, according to claim 5, wherein the radio frequency signal is delayed for a specified time interval.

8. The safety device, according to claim 5, wherein the radio frequency signal is generated if the vehicle is not in motion for a specified time interval.

9. The safety device, according to claim 5, wherein the radio frequency signal is generated if the receiver meets or exceeds a specified distance from the transmitter.

10. The safety device, according to claim 5, wherein the said seat belt interlock signal receiving means which is separate from the said transmitter is a key fob.

11. The safety device, according to claim 5, wherein the said seat belt interlock signal receiving means which is separate from the said transmitter is a key fob has the appearance of a human infant.

12. The safety device, according to claim 5, wherein the said seat belt interlock signal receiving means which is separate from the said transmitter converts a signal received from the said means to alert at least one person to a sound mimicking a human infant.

13. A method of alerting an individual that an unsafe condition exists in a vehicle comprising obtaining a safety device comprising:

a seat belt interlock male connector and a seat belt interlock female connector;

seat belt interlock female connector, for when in use, receiving a vehicular seat belt male connector;

seat belt interlock male connector, for when in use, connecting with a vehicular seat belt female connector;

said seat belt interlock has detection means for determining if at least one of seat belt interlock male connector or the said seat belt interlock female connector is connected respectively with the vehicular seat belt female connector or the vehicular seat belt male connector, and;

the said seat belt interlock has means to alert at least one person that at least one of the said seat belt interlock male connector is connected with the said seat belt female connector or the said seat belt interlock female connector is connected with the seat belt male connector, and operating the device by connecting at least one of the said seat belt female connector with a vehicular seat belt male connector or connecting the said seat belt interlock male connector with a vehicular seat belt female connector.

* * * * *